United States Patent [19]

Brown et al.

[11] Patent Number: 5,637,991

[45] Date of Patent: Jun. 10, 1997

[54] POWER SUPPLY INCLUDING A DETECTION AND SWITCH SYSTEM FOR UNI-PLANE AND SPLIT-PLANE DEVICES

[75] Inventors: Alan E. Brown, Georgetown; Joseph D. Mallory, Cedar Park; Joshua Titus; Joseph A. Vivio, both of Austin, all of Tex.

[73] Assignee: Dell USA, L.P., Austin, Tex.

[21] Appl. No.: 426,390

[22] Filed: Apr. 21, 1995

[51] Int. Cl.$^6$ ..................................................... G05F 1/40
[52] U.S. Cl. ............................................. 323/282; 323/269
[58] Field of Search ..................................... 323/269, 272, 323/282, 285; 363/78, 142

[56] References Cited

U.S. PATENT DOCUMENTS

| | | | |
|---|---|---|---|
| 4,074,182 | 2/1978 | Weischedel | 323/25 |
| 5,119,013 | 6/1992 | Sabroff | 323/282 |
| 5,386,359 | 1/1995 | Nochi | 323/282 |
| 5,396,412 | 3/1995 | Barlage | 323/282 |
| 5,412,308 | 5/1995 | Brown | 323/272 |

*Primary Examiner*—Stuart N. Hecker
*Attorney, Agent, or Firm*—Henry N. Garrana; Mark P. Kahler; Michelle M. Turner

[57] ABSTRACT

A power supply including a detection and switch system for sensing either a uni-plane or a split-plane device connected to a socket and for providing one or two supply voltages, respectively. In one embodiment, a dual output regulator includes first and second regulators with corresponding first and second feedback circuits and comparators for regulating first and second outputs, respectively. A switch circuit connects the second feedback circuit to the comparator of the second regulator in split-plane mode for providing the second output. However, the switch circuit connects the first feedback circuit to the comparator of the second regulator in uni-plane mode where the two outputs are coupled together by a uni-plane device, so that the two outputs are regulated at the same level. A detection circuit monitors the output signals and controls the switch circuit depending upon whether a uni-plane or split-plane device is detected. The detection circuit includes a comparator which compares the output voltages, which are the same if connected to a uni-plane device or separated by a predetermined amount if connected to a split-plane device. In one regulator embodiment, the outputs are compared after reaching regulation and in a second regulator embodiment, one regulator is momentarily disabled for making the comparison while either one or both outputs voltages are increasing. In another embodiment, two separate power supplies are included for providing separate voltage levels if a split-plane device is connected, where the second power supply is disconnected if a uni-plane device is connected.

30 Claims, 5 Drawing Sheets

POWER SUPPLY INCLUDING A DETECTION AND SWITCH SYSTEM FOR UNI-PLANE AND SPLIT-PLANE DEVICES

FIELD OF THE INVENTION

The present invention relates to power supplies, and more particularly to a power supply for detecting whether a uni-plane or a split-plane device is connected and for providing the appropriate supply voltage(s).

DESCRIPTION OF THE RELATED ART

Most chips or integrated circuits (ICs) typically derive power from a single voltage source, although this depends upon the particular functions of the IC. Microprocessors of personal computer systems, for example, are almost invariably powered from a single voltage source. However, for specific performance reasons, some manufacturers are providing devices which require two DC voltage sources having different amplitudes. For example, the new P54 family of microprocessors by Intel require separate I/O and core DC voltages for proper operation. A device requiring a single voltage source is referred to as a uni-plane device, while a device requiring two or more voltage sources is referred to as a split-plane device.

It is desirable to provide a single supply voltage to a uni-plane device or to provide more than one supply voltage to a split-plane device plugged into a single or common socket interface. Such a feature would allow either a uni-plane or split-plane device to be plugged into the socket and receive the appropriate supply voltages. Further, it is desired to detect which type of device is connected and to provide the appropriate supply voltage(s).

SUMMARY OF THE INVENTION

A power supply according to the present invention detects whether a uni-plane or split-plane device is plugged into a common socket interface and provides the appropriate supply voltages. In a voltage regulator embodiment, two separate regulators receive a source input voltage and actively regulate two separate or dual outputs. After power is initially applied, a logical decision is made whether or not to switch to a uni-plane mode, where the second regulator is coupled to the same feedback signal and thus regulates at the same voltage as the first. This decision is made by reviewing the voltage difference between the two regulator outputs. If a uni-plane device is present, the two output voltages are effectively coupled together and thus essentially have the same voltage level regardless of any attempt to regulate them at different levels. Thus, if there is no substantial voltage difference between the two outputs, the circuit switches to uni-plane mode. However, if there is a certain voltage difference between the two outputs indicating a split-plane device is connected, the split-plane mode is maintained.

The voltage regulators include two separate amplifiers for comparing a reference voltage with two feedback voltages derived from the two regulator outputs, respectively. The two amplifiers control separate transistor circuits for regulating the two outputs to different voltage levels. A detection circuit monitors the output voltages and controls a switch circuit to determine the appropriate mode. In particular, uni-plane mode is selected if the voltages remain relatively equal, whereas split-plane mode is selected when the two output voltages are different by a predetermined amount. The switch circuit connects the feedback path from the second output to the second amplifier in split-plane mode, but otherwise connects the feedback path from the first output to the second amplifier in the uni-plane mode. The switch circuit preferably includes a couple of analog gates for switching the desired feedback path. A latch circuit provides enable signals to the analog gates so that only one gate is activated at any time to connect the desired feedback path.

A comparator is preferably used within the detection circuit to monitor both outputs during power-up to determine if uni-plane or split plane mode is needed. In one embodiment, mode determination is made after the outputs have achieved a regulating voltage level. A timing circuit initially sets the switch circuit according to the split-plane mode upon power-up and then enables a gate to receive a reset signal to toggle the switch circuit for uni-plane mode for a predetermined period after power-up. This time period is long enough for both outputs to reach a regulating level. The comparator compares the output voltage levels and asserts the reset signal if the difference between the output voltages is less than a certain mount. Otherwise, the reset signal is not asserted and split-plane mode is maintained.

In another regulator embodiment, a disable circuit momentarily disables the second regulator and compares the output voltage while the first output voltage is rising but before it reaches its regulating level. The switch circuit is set according to split-plane mode until the first output voltage reaches a certain voltage, substantially less than regulating level, while the second regulator is still disabled. A timing circuit is then initiated for a predetermined period to allow the switch circuit to be reset. A comparator identifies a dual-mode device if the magnitude of the second output voltage is less than a predetermined ratio of the first output voltage while the first output voltage is increasing, but otherwise identifies a uni-plane device and asserts the reset signal. Then, after the mode determination is made, the second regulator is enabled. In this latter embodiment, the operation mode is accomplished before the regulators reach full regulating output voltages, so that the appropriate mode is almost immediately established.

In an alternative embodiment, two separate voltage supplies are coupled to a detection and switch circuit for switching the supply voltages. A first power supply provides sole power to a uni-plane device or provides core power to a split-plane device. A second power supply provides power to the I/O region of a split-plane device or solely to remaining support circuitry if the device is uni-plane. A supervisory circuit is also provided which asserts a power good signal when a primary supply voltage achieves regulation, and then asserts a reset signal after a short time period to reset the electronic device. As in the voltage regulator embodiments described above, split-plane mode is initially assumed so that the first power supply attempts to regulate at a different, lower voltage level compared to the second power supply. A detection circuit includes a comparator for monitoring the output voltage of the first power supply and provides a switch signal if it rises above a predetermined level indicating uni-plane. A switch circuit disconnects the second power supply from the device if the switch signal is asserted when the power good signal is asserted since the device is uni-plane and requires only a single voltage supply. The first supply may be programmable to provide a new voltage if the device is uni-plane. In the dual power supply embodiment, the supervisory circuit provides power good and reset indications so that the desired mode is achieved prior to reset after power-up.

It is therefore appreciated that a power supply according to the present invention detects a uni-plane or split-plane device and provides the appropriate supply voltage(s).

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
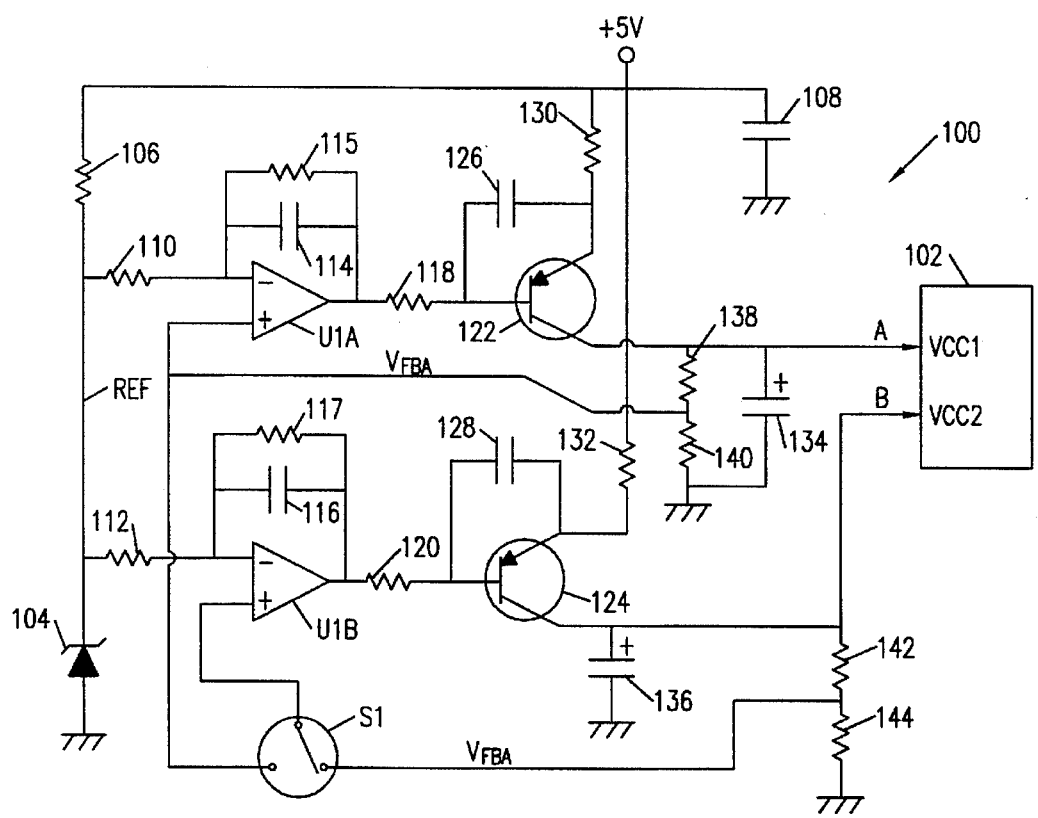
FIG. 1 is a schematic diagram of a split-plane regulator according to the present invention including manual switching means.

Referring now to FIG. 1, a schematic diagram is shown of a voltage regulator 100 according to the present invention including a manual switch S1 for switching between uni-plane and split-plane modes. A 5 volt (V) DC source, referred to as the +5 V signal, is filtered through a capacitor 108 to ground and is connected through a resistor 106 to the cathode of a Zener diode 104 for developing a reference voltage referred to as REF, where the anode of the Zener diode 104 is connected to ground. The Zener diode 104 is preferably the LT1009 by Linear Technologies, Inc. for developing a reference voltage of 2.5 V. The REF signal is provided through resistors 110 and 112 to the inverting inputs, respectively, of two amplifiers U1A and U1B. Capacitors 114, 116 and resistors 115, 117 are connected between the inverting inputs and the outputs of the amplifiers U1A and U1B, respectively, where the outputs are further fed through resistors 118, 120, respectively, to the base terminals of two transistors 122, 124, respectively.

The transistors 122, 124 are preferably pnp bipolar transistors, such as the TIP 125, although other linear switching devices will suffice. Both transistors 122, 124 have filter capacitors 126, 128 coupled between their emitters and base terminals, respectively, and also have resistors 130, 132 coupled between the +5 V signal and their respective emitters for sourcing current through the transistors 122, 124. The collector of transistor 122 provides the output voltage A, which is filtered through a capacitor 134 for developing a voltage level of approximately 3.525 V. The collector of the transistor 124 develops an output voltage referred to as B, which is preferably 3.300 V in the preferred embodiment, which is filtered by another capacitor 136 to ground. The A and B outputs are shown provided to the VCC1 and VCC2 inputs, respectively, of a split-plane device 102. However, a uni-plane device includes only a single VCC input, which is connected to both the A and B outputs. Thus, the A and B outputs have essentially the same output voltage if connected to a uni-plane device.

The A output is sampled through a resistive voltage divider comprising resistors 138 and 140 coupled in series between the A output and ground, having a junction providing a feedback signal $V_{FBA}$ to the non-inverting input of the amplifier U1A. In a similar manner, the B output is sampled through a resistive voltage divider comprising resistors 142 and 144 coupled in series between the B output and ground, having a junction providing a signal $V_{FBB}$. A single pole, double throw switch S1 has its common terminal connected to the non-inverting input of the amplifier U1B, which has its other terminals coupled to the $V_{FBA}$ and $V_{FBB}$ signals, respectively.

The switch S1 is a manual switch for selecting between the $V_{FBA}$ and $V_{FBB}$ feedback signals and providing the selected signal to the non-inverting input of the amplifier U1B. In particular, the $V_{FBB}$ feedback signal is selected according to split-plane mode where the regulator 100 regulates separate voltages on the A and B outputs as described above. It is noted, however, that if a uni-plane device is present, both A and B outputs are coupled together and have the same voltage level in spite of separate regulation. If switch S1 selects the $V_{FBA}$ signal according to uni-plane mode, then both the A and B outputs are regulated at the voltage level, which is preferably the same voltage as the A output of 3.525 V. In this manner, the regulator 100 is manually switched between the uni-plane and split-plane modes. The voltage regulator 100 is not very practical since it requires manual switching to select between the desired modes.

Figure 2A:
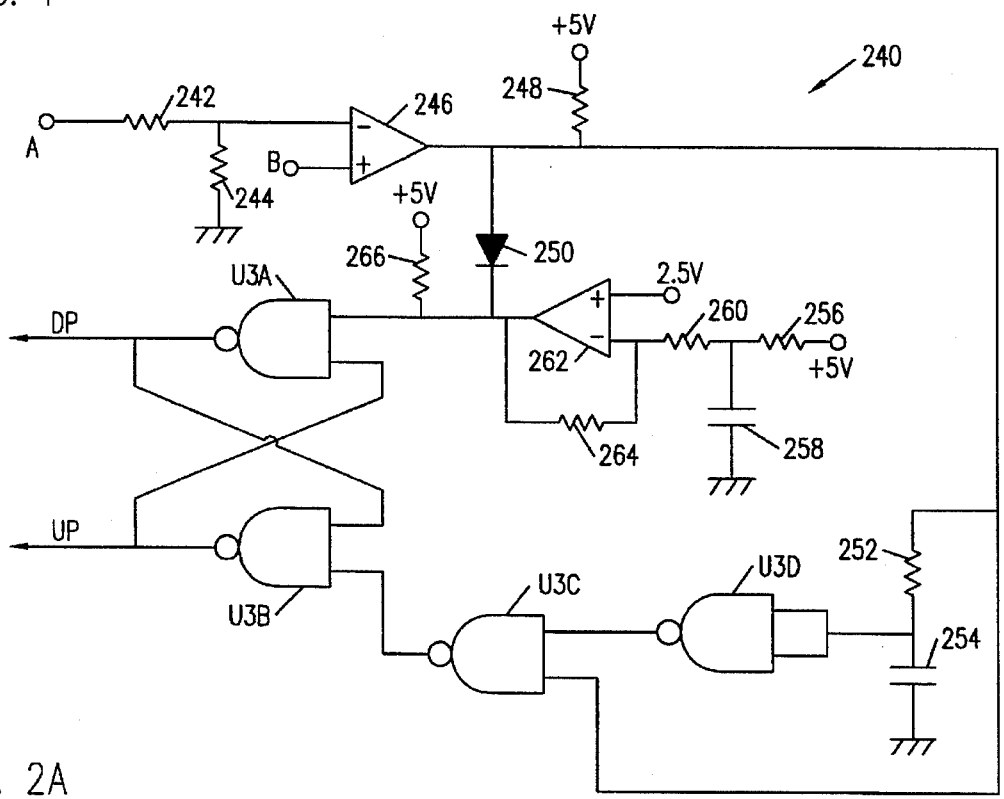
FIG. 2A is another embodiment of the mode sensing circuitry of FIG. 2 for determining switching between uni-plane and split-plane modes.
Figure 2:
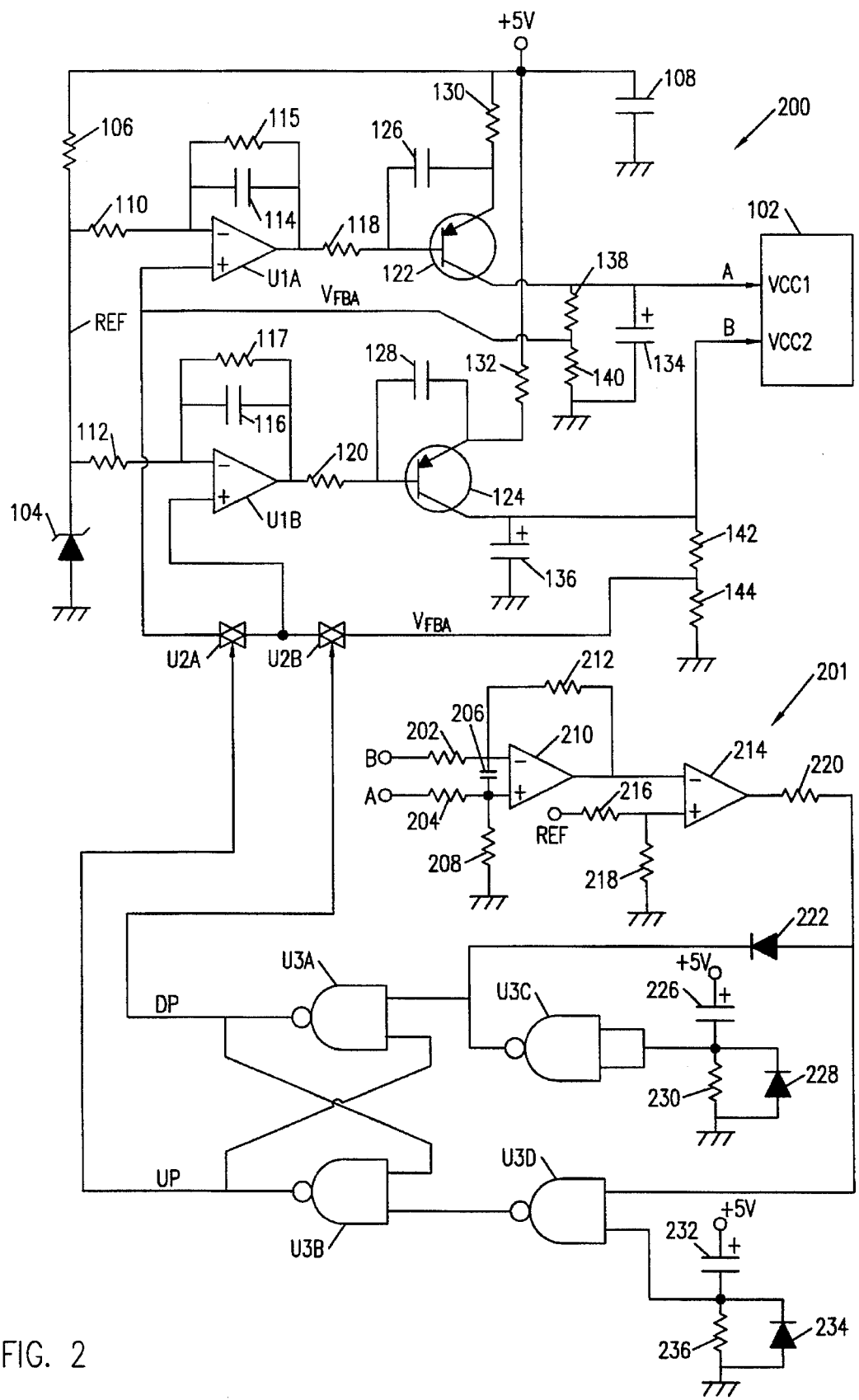
FIG. 2 is a voltage regulator according to the present invention using automatic detection and switching means.

Referring now to FIG. 2, a schematic diagram of a voltage regulator 200 is shown including an automatic detection circuit 201 for switching between uni-plane and split-plane modes. The primary portion of the voltage regulator 200 is similar to the voltage regulator 100 where similar components have identical reference numerals. Thus, the Zener diode 106, the amplifiers U1A, U1B, the transistors 122, 124 and supporting components are used to regulate the A and B outputs as described above. In this embodiment, however, the manual switch S1 is replaced by two separate analog gates, U2A and U2B. In particular, the $V_{FBA}$ signal is provided to the input of analog gate U2A, having its output provided to the non-inverting input of the amplifier U1B. In a similar manner, the $V_{FBB}$ signal is provided to the input of the analog gate U2B, having its output connected to the non-inverting input of the amplifier U1B. Only one of the analog gates, U2A, U2B is on at any given time as described below, where the analog gate U2B selects split-plane mode and the analog gate U2A selects uni-plane mode.

In the detection circuit 201, the B output is provided through a resistor 202 to one side of the capacitor 206 and to the inverting input of an amplifier 210. The A output is provided through a resistor 204 to the other side of the capacitor 206, to one end of a resistor 208 and to the non-inverting input of the amplifier 210. The other end of the resistor 208 is connected to ground and a feedback resistor 212 is coupled between the inverting input and the output of the amplifier 210. Generally, the amplifier 210 serves as a buffer which asserts a voltage at its output equivalent to the voltage differential between the A and B outputs.

The output of the amplifier 210 is provided to the inverting input of another 210 amplifier 214. A voltage divider comprising resistors 216 and 218 coupled in series between the REF signal and ground has a junction connected to the non-inverting input of the amplifier 214. The amplifier 214 serves as a comparator for comparing the differential voltage of the A, B outputs with the voltage established by the resistive voltage divider of the resistors 216, 218. The resistors 216, 218 are chosen so that the REF signal is divided to a predetermined voltage level less than the expected A/B differential of 3.525–3.3=0.225 V. This voltage is preferably chosen at approximately 0.15 mV. Thus, if the A and B outputs are different by more than 0.15 V, then the amplifier 214 asserts its output low, but otherwise asserts it output high.

The output of amplifier 214 is provided to one end of a resistor 220, having its other end connected to the anode of a diode 222 and to one input of a two-input NAND gate U3D. The cathode of the diode 222 is provided to one input of another two-input NAND gate U3A, which is cross-coupled with another two-input NAND gate U3B implementing an set-reset (S-R) latch. The output of the NAND gate U3A, referred to as DP (split-plane), is provided to one input of the NAND gate U3B, having its output, referred to as UP (uni-plane) connected to the other input of the NAND gate U3A to implement the S-R latch. The output of another NAND gate U3C is also connected to the cathode of the diode 222. The +5 V signal is provided to one end of a capacitor 226, having its other end connected to both inputs of the NAND gate U3C, to one end of a resistor 230 and to the cathode of a diode 228. The other end of the resistor 230 and the anode of the diode 228 are both connected to ground. The +5 V signal is also provided to one end of a capacitor 232, having its other end connected to the other input of the NAND gate U3D, to one end of a resistor 236 and to the cathode of a diode 234. The other end of the resistor 236 and the anode of diode 234 are both connected to ground. The output of the NAND gate U3D is provided to the other input of the NAND gate U3B. Finally, the output of the NAND gate U3A is connected to the control terminal of the analog gate U2B, while the output of the NAND gate U3B is connected to the control terminal of the analog gate U2A. The NAND gates U3A–U3D are all preferably the 74HC132-type gates, which exhibit correct operation at relatively low source voltage levels, such as 1 V.

The operation of the voltage regulator 200 is now described. Upon power-up, +5 V signal is the primary power source and thus begins rising relatively quickly and pulls both inputs of the NAND gate U3C high through the capacitor 226. The +5 V signal also pulls one input of the NAND gate U3D high through the capacitor 232. The NAND gate U3C acts as an inverter and asserts its output low, which causes the NAND gate U3A to initially assert its output high to select the analog gate U2B. The NAND gate U3C also pulls the other input of the NAND gate U3D low through the diode 222, so that the output of the NAND gate U3D is asserted high. The NAND gate U3B initially asserts its output low since both its inputs are high. In this manner, the analog gate U2B is initially activated while the analog gate U2A is turned off, so that split-plane mode is initially selected upon power-up.

If the device 102 is a split-plane device, then the A output begins regulating at 3.525 V while the B output begins regulating at 3.3 V as desired. The amplifier 210 asserts its output higher than the voltage at the non-inverting input of the amplifier 214, so the amplifier 214 asserts its output low. However, if the device 102 is a uni-plane device, then the voltage of the A and B outputs are equal and the amplifier 214 asserts its output high.

The resistor 230 is chosen smaller than the resistor 236, so that the capacitor 226 charges faster than the capacitor 232 since these capacitors have roughly equal capacitances. The RC time constant of the resistor 230 and the capacitor 226 is chosen long enough to keep one input of both NAND gates U3A and U3D low during power-up to initially set the latch U3A, U3B according to split-plane mode. The RC time constant of the resistor 236 and the capacitor 232 is chosen longer and sufficient to allow the A and B outputs to reach a regulating level. As an example, the capacitors could be 2.2 µF capacitors, where the resistor 230 is 270 KΩ and the resistor is 470 KΩ. Thus, the capacitor 226 charges pulling the inputs of the NAND gate U3C low, which asserts its output high. This releases the diode 222, so that the amplifier 214 now drives the other input of the NAND gate U3D. If the device 102 is a split-plane device so that the amplifier 214 asserts its output low, the state of the NAND gate U3D and the S-R latch U3A, U3B does not change, so that the split-plane mode is maintained. The capacitor 232 then charges to pull one input of the NAND gate U3D low, so its keeps its output high during the remainder of operation.

However, if the device 102 is a uni-plane device so that both inputs to the NAND gate U3D are momentarily pulled high, the NAND gate U3D asserts its output low to "reset" the S-R latch U3A, U3B, where the NAND gate U3B activates the analog gate U2A and the NAND gate U3A turns off the analog gate U2B. In response, the amplifier U1B controls the transistor 124 to regulate its output to 3.525 V, which is the same as the A output voltage. The capacitor 232 then charges so that the NAND gate U3D asserts its output high. Uni-plane mode is selected for the remainder of operation.

In this manner, the detection circuit 201 initially selects split-plane mode by selecting the analog gate U2B. After the output voltages begin regulating, they are compared through amplifiers 210, 214 to determine if a uni-plane device is connected. The RC timing parameters of the resistor 230 and capacitor 226 and the resistor 236 and capacitor 232 provides a window of time in which to switch to the uni-plane mode. Although this method is acceptable and achieves the desired result, it may further be desired to detect whether a uni-plane or split-plane device is connected before final voltage regulation is reached. The voltage regulator 200 with the detection circuit 201 has a further limitation of requiring that the A output voltage be greater than the B output voltage in split-plane mode. It may be desired to have the A output voltage be less than the B output voltage.

Referring now to FIG. 2A, another detection circuit 240 is shown which is similar to the detection circuit 201. The A output voltage is provided across a voltage divider comprising resistors 242 and 244 coupled in series between the A output and ground. The resistors 242, 244 have a junction connected to the inverting input of a comparator 246. The non-inverting input of the comparator 246 is connected to the B output, and the output of comparator 246 is coupled to one end of a pull-up resistor 248 and to the anode of a diode 250. Also, the output of comparator 246 is connected to one end of a resistor 252 and to one input of the NAND gate U3C. The other end of the resistor 252 is connected to both inputs of the NAND gate U3D and to one end of a capacitor 254, having its other end connected to ground. The output of the NAND gate U3D is connected to the other input of the NAND gate U3C.

The +5 V signal is provided to one end of a resistor 256, having its other end connected to one end of a capacitor 258 and to one end of a resistor 260. The other end of the capacitor 258 is connected to ground and the other end of the resistor 260 is provided to the non-inverting input of a comparator 262 and to one end of a feedback resistor 264. The inverting input of the comparator 262 receives a reference voltage signal of 2.5 V. The output of comparator 262 is connected to the other end of the resistor 264, to the cathode of diode 250, to one end of a pull-up resistor 266 and to one input of the NAND gate U3A. The other end of the resistor 266 is connected to the +5 V signal. The output of the NAND gate U3A is connected to one input of the NAND gate U3B, having its output connected to the other input of the NAND gate U3A in a similar manner as described previously for implementing an S-R latch. Again, the output DP of the NAND gate U3A is connected to the control terminal of the analog gate U2B and the output UP of the NAND gate U3B is connected to the control terminal of the analog gate U2A.

The operation of the detection circuit 240 is now described. The comparator 262 initially asserts its output low during power-up, which causes both the NAND gate U3A and U3C to assert their outputs high. The A and B outputs begin regulating, and the comparator 246 asserts its output high if a uni-plane device is connected, but otherwise asserts its output low. Meanwhile, the capacitor 258 charges and the comparator 262 asserts its output high releasing the diode 250. If the device 102 is a split-plane device, the comparator 246 keeps one input of the NAND gate U3C low so that split-plane mode is maintained. However, if a uni-plane device is connected, the comparator 246 asserts its output high, which begins charging the capacitor 254. Both inputs to the NAND gate U3C are momentarily asserted high, which resets the S-R latch U3A, U3B to select the analog gate U2A according to the uni-plane mode. The capacitor 254 finally charges so that NAND gate U3D asserts its output low, so NAND gate U3C keeps its output high for the remainder of operation. Thus, operation is similar to the detection circuit 201 in that the mode decision is made after the A and B outputs have reached a regulating voltage. Also, it is required that the A output voltage be greater than the B output voltage in split-plane mode.

Figure 3:
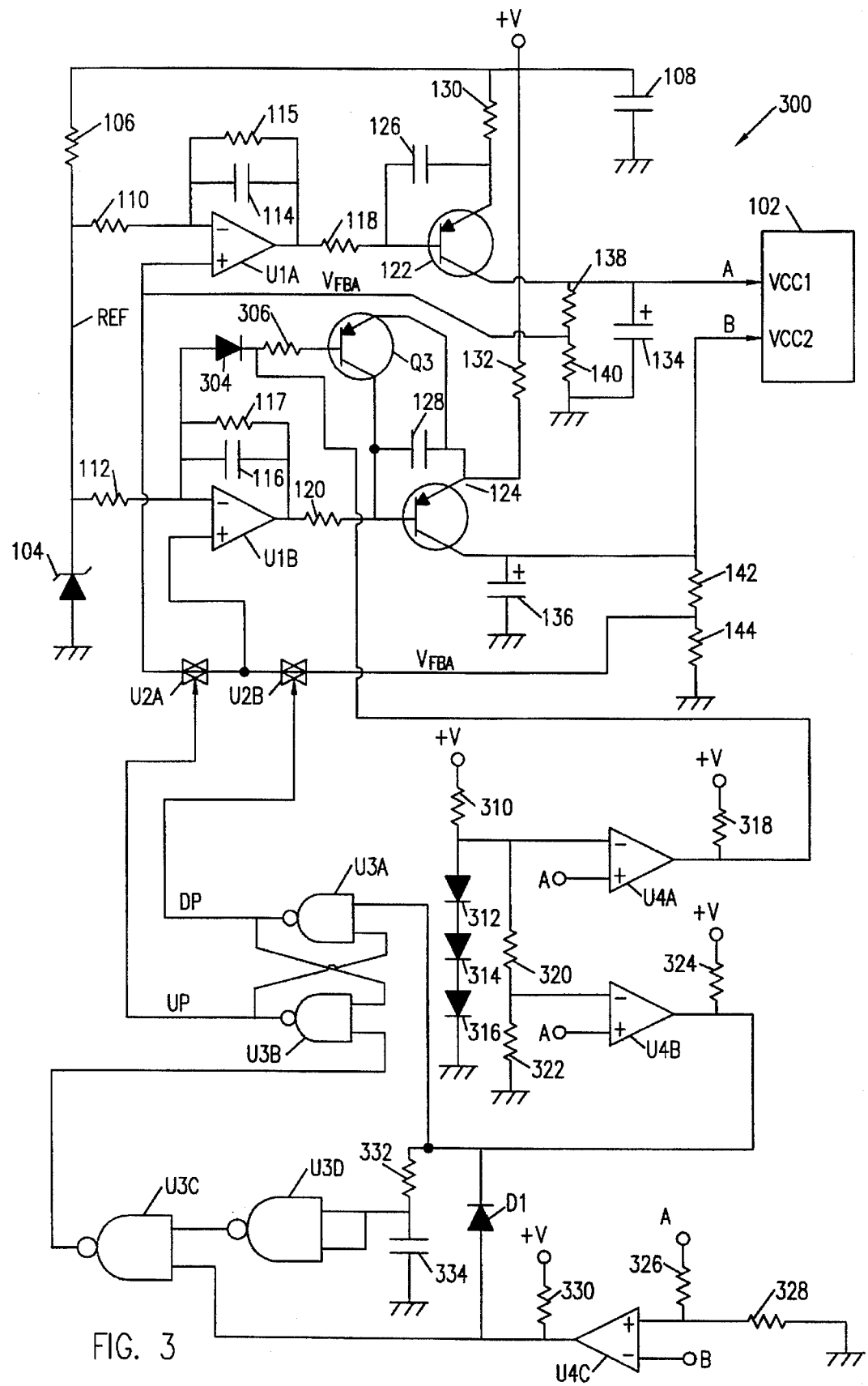
FIG. 3 is another regulator embodiment of a voltage regulator using automatic mode detection and switching according to the present invention.

Referring now to FIG. 3, a schematic diagram is shown of a voltage regulator 300 including a detection circuit 302, which is implemented according to the present invention. The primary regulating portions of the voltage regulator 300 are similar to that of the voltage regulators 100 and 200, so that similar components assume identical reference numerals. However, in this embodiment, some of the resistor and capacitor values may be slightly modified for maximum operation where such variances are considered merely design choices and not intended for limiting the present invention. Also, since the primary input voltage may have any voltage desired, it is referred to simply as the +V signal. Further, the Zener diode 104 may be modified to select any desired reference voltage level below the +V signal. The A and B output voltages are developed in a relatively similar manner using the Zener diode 104, the amplifiers U1A, U1B, the transistors Q1 and Q2 and supporting components. However, the inverting input of the amplifier U1B is further connected to the anode of a diode 304, having its cathode connected to one end of a resistor 306. The diode 304 is optional and not necessary for desired functionality, where the resistor 306 could otherwise be connected directly to the inverting input of the amplifier U1B. The other end of the resistor 306 is provided to the base terminal of a transistor Q3, having its emitter connected to the emitter of the transistor Q2. The collector of transistor Q3 is also connected to the base of the transistor Q2.

In the detection circuit 302, the +V signal is connected to one end of a resistor 310, having its other end connected to the anode of a diode 312 and to the inverting input of a comparator U4A. Three diodes 312, 314, 316 are connected in series between the resistor 310 and ground for developing a reference voltage of approximately 1.5 V to the comparator U4A. The non-inverting input of a comparator U4A receives the A output. The output of the comparator U4A is connected to the cathode of the diode 304 and to one end of a pull-up resistor 318, having its other end connected to the +V signal.

The inverting input of the comparator U4A is also connected through a resistive voltage divider comprising series resistors 320 and 322 to ground, having a junction connected to the inverting input of a comparator U4B. The resistors 320, 322 further divide the 1.5 V reference signal to approximately 1.25 V. The non-inverting input of comparator U4B is connected to the A output, and the output of comparator U4B is connected through pull-up resistor 324 to the +V signal. The output of comparator U4B is also connected to one input of the NAND gate U3A, which is cross-coupled with the NAND gate U3B in a similar manner as described previously.

The B output is connected to the non-inverting input of a comparator U4C, having its inverting input connected to the junction of a resistive voltage divider comprising two resistors 326 and 328 coupled in series between the A output and ground. The output of comparator U4C is connected through pull-up resistor 330 to the +V signal, to the anode of a diode D1 and to one input of the NAND gate U3C. The output of NAND gate U3C is connected to one input of the NAND gate U3B and the cathode of diode D1 is connected to the output of the comparator U4B. The output of comparator U4B is also connected to one end of a resistor 332, having its other end connected to both inputs of the NAND gate U3D and to one end of a capacitor 334, having its other end connected to ground. The output of the NAND gate U3D is connected to the other input of the NAND gate U3C. Again, the output DP of the NAND gate U3A is connected to the control terminal of the analog gate U2B and the output UP of the NAND gate U3B is connected to the control terminal of the analog gate U2A.

Figure 4:
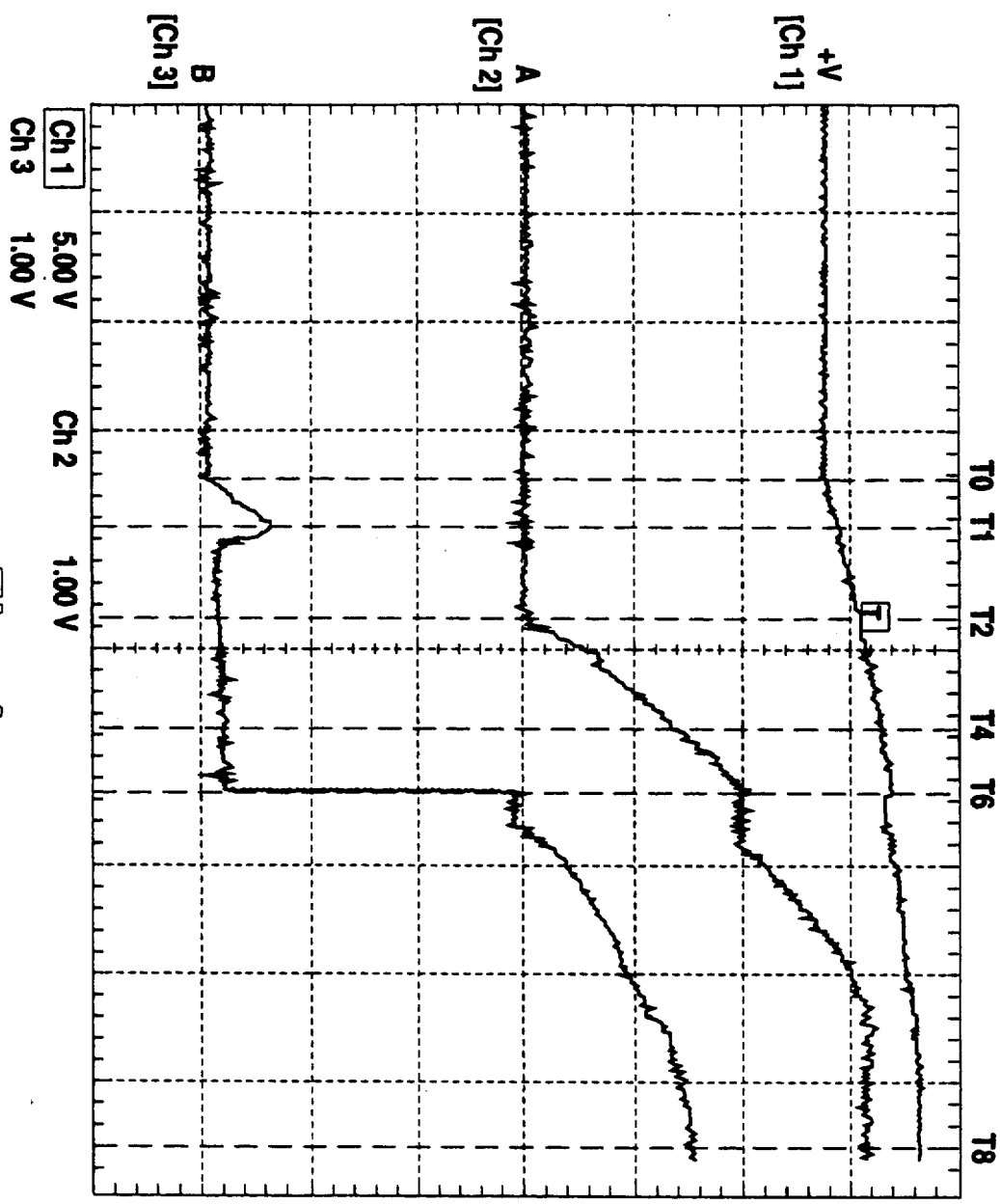
FIG. 4 is a timing diagram illustrating operation of the voltage regulator of FIG. 3.

Operation of the voltage regulator 300 including the detection circuit 302 will now be described with reference to the timing diagram of FIG. 4. The voltage signal +V, A and B are plotted versus time from power-up at a time T0. The +V is plotted with a different scale than the A and B outputs. Upon power-up at time T0, the +V signal rises relatively quickly and establishes a 1.5 V reference signal at the inverting input of the comparator U4A through the three diodes 312, 314 and 316. The A signal does not begin to rise until a subsequent time T2. The comparator U4A initially asserts its output low, turning on the transistor Q3, which in turn keeps the transistor Q2 off. Thus, the B output voltage is initially not regulated after power is applied, although the B output will rise with the A output if a uni-plane device is connected. If a split-plane device is connected, the B output may float slightly above 0 volts, but will tend to be pulled low through the resistors 142, 144. FIG. 4 illustrates the case where the device 102 is a split-plane device so that B output stays low. The glitch of the B output voltage at time T1 occurs because of a momentary indeterminate state of the NAND gates U3A–D. However, this glitch is negligible and disappears quickly after the +V signal reaches about 1 V.

The comparator U4B initially asserts its output low which causes the NAND gate U3A to assert its output high to initially select the analog gate U2B according to the split-plane mode. The comparator U4B also pulls one input of the NAND gate U3C low through the diode D1, so that the NAND gate U3B initially asserts its output low. Thus, the split-plane mode is initially selected. The voltage divider comprising the resistors 320 and 322 provides a reference voltage of approximately 1.25 V to the inverting input of the comparator U4B, which asserts its output high when the A output voltage rises above 1.25 V, which occurs at a time T4.

At this point in time, the comparator U4C selects uni-plane or split-plane mode based on the voltage ratio of the A and B outputs. If device 102 is a split plane device, the B output voltage is still low when the comparator U4B asserts its output high at time T4, so that the comparator U4C maintains its output low. This comparison is based on the ratio of the resistors 326, 328, which resistors are preferably equal. Thus, if the B output is less than 50% of the A output voltage, one input of the NAND gate U3C is kept low, so that the S-R latch U3A, U3B maintains its initial state and split-plane mode is maintained.

However, if the A and B outputs are rising together due to a uni-plane device 102 connected to the voltage regulator 300, then the comparator U4C asserts its output high before or by the time the comparator U4B asserts its output high. The capacitor 334 initially pulls both inputs of the NAND gate U3D low, so that the NAND gate U3D initially asserts its output high. When the comparator U4B asserts its output high, the capacitor 334 begins charging through the resistor 332. Since the output of the NAND gate U3D remains high until the capacitor 334 is charged, both inputs to the NAND gate U3C are momentarily asserted high so that the NAND gate U3C asserts its output low, thereby resetting the S-R latch U3A, U3B. In this manner, uni-plane mode is selected where the NAND gate U3B activates the analog gate U2A, whereas the NAND gate U3A turns off the analog gate U2B according to the uni-plane mode. In this manner, either uni-plane or split-plane mode is selected prior to either of the A or B outputs achieving regulation.

Eventually, the A output voltage reaches 1.5 V at time T6 activating the comparator U4A, which turns off the transistor Q3, thereby turning on transistor Q2, so that the B output voltage is allowed to be regulated by the amplifier U1B. Thus, at about time T6, the B output voltage immediately rises until controlled by the amplifier U1B. Of course, the B output voltage is regulated to 3.3 V in split-plane mode if the analog gate U2B is selected, or is regulated at 3.525 V in uni-plane mode if the analog gate U2A is selected. The A and B achieve regulation at a subsequent time T8, as shown.

The voltage regulator 300 with the detection circuit 302 has several advantages over the voltage regulators 100, 200 described previously. The detection circuit 302 makes the logical determination as to which kind of device is detected and chooses the appropriate mode while one or both output voltages are rising, but before it (they) reach(es) operational regulation. Furthermore, detection circuit 302 does not require that the A output voltage be greater than the B output voltage in the split-plane mode, since it makes the appropriate decision regardless of the ultimate regulated voltage levels. This is true since the regulation of the B output voltage is disabled during initial power-up facilitating mode detection. Thus, the voltage regulator 300 with detection circuit 302 provides superior performance and greater design flexibility for providing voltage regulation to either uni-plane or split-plane devices.

Figure 5:
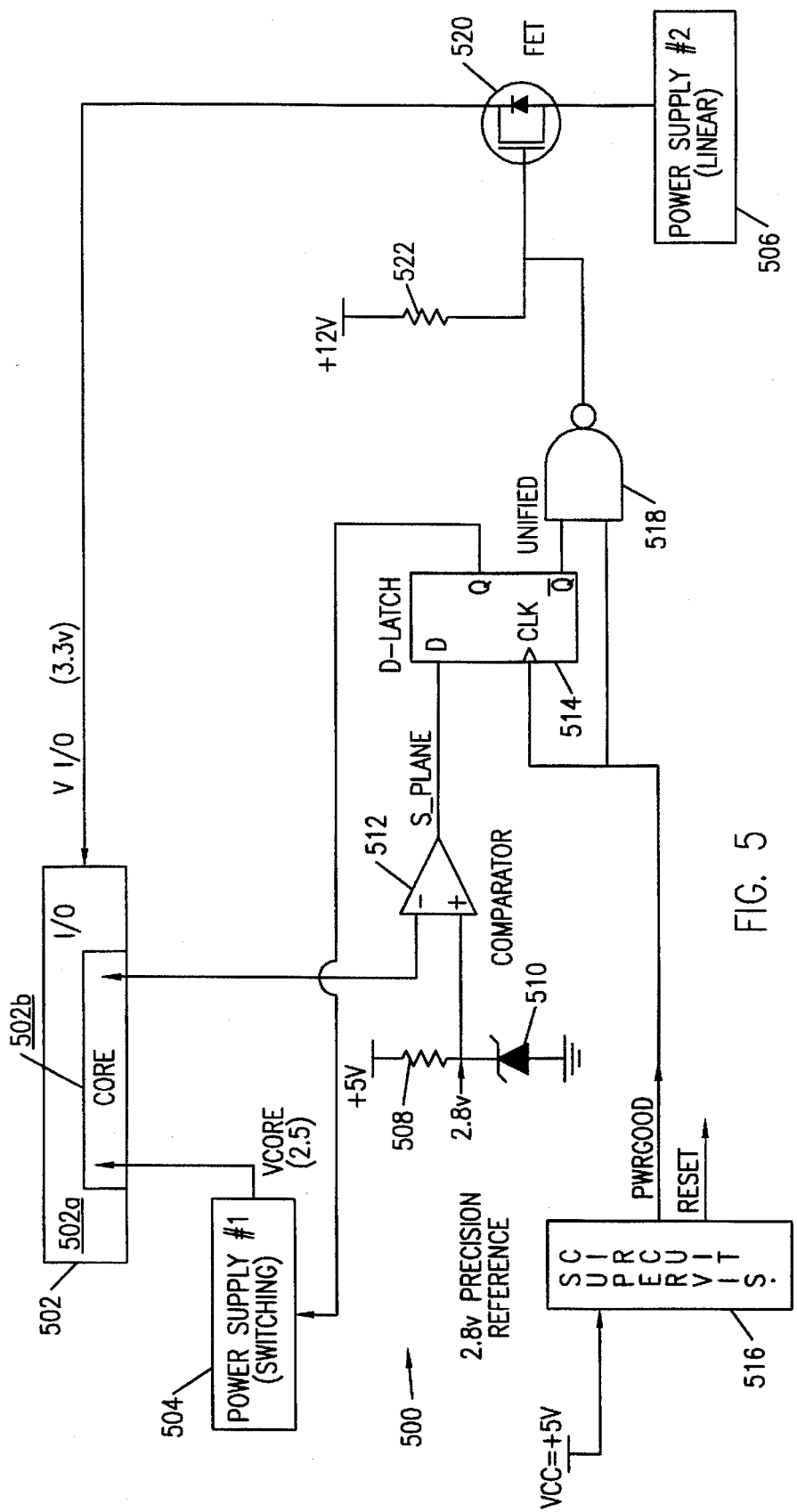
FIG. 5 is a dual power supply embodiment according to the present invention.

Referring now to FIG. 5, a schematic diagram is shown of a dual power supply circuit 500 according to an alternative embodiment of the present invention. A device 502 is either a split-plane device requiring separate supply voltages to an I/O section 502a and a core section 502b or a uni-plane device where the I/O and core sections 502a, 502b are internally connected together. A first power supply 504 provides a supply voltage directly to the core section 502b and a second power supply 506 supplies power through a transistor 520 to the I/O section 502a. The power supply 504 is preferably a switching type supply initially providing an output voltage of 2.5 V, whereas the power supply 506 is preferably a linear-type supply providing an output voltage of approximately 3.3 V. The primary supply voltage is preferably 5 V and is referred to by a signal +5 V. The +5 V signal is provided to one end of a resistor 508, having its other end connected to the cathode of a Zener diode 510, having its anode connected to ground. The Zener diode 510 is preferably a 2.8 V precision reference device. The cathode of the diode 510 is provided to the non-inverting input of a comparator 512, having its inverting input for monitoring the supply voltage developed on the core section 502b. It is noted that the voltage developed on the core section 502b is not necessarily the same as the output of the power supply 504.

The output of the comparator 512 is connected to the D input of a D-type latch 514, which receives a signal PWR-GOOD at its clock input from a supervisory circuit 516. The supervisory circuit 516 is preferably the MAX708 which monitors the +5 V signal and asserts the PWRGOOD signal once the +5 V signal achieves a voltage of 4.6 V after power-up. The supervisory circuit 516 also asserts a RESET* signal upon power-up to keep the electronic device (not shown) in a reset condition until regulated power is available. An asterisk (*) at the end of a signal name denotes negative logic where the signal is considered asserted when low and unasserted when high. Approximately 200 ms after the PWRGOOD signal is asserted, the supervisory circuit 516 de-asserts the RESET* signal to allow the electronic device to initiate normal operation.

The inverted Q output of the latch 514 is provided to one input of a two-input NAND gate 518, which receives the PWRGOOD signal at its other input. The output of NAND gate 518 is provided to the gate of a field-effect transistor (FET) 520 and also to one end of a resistor 522 receiving another primary supply voltage having a voltage level of approximately 12 V, referred to as the +12 V signal. The drain of the FET 520 receives the output of the power supply 506 and its source is connected to the I/O section 502a of the device 502.

Figure 6:
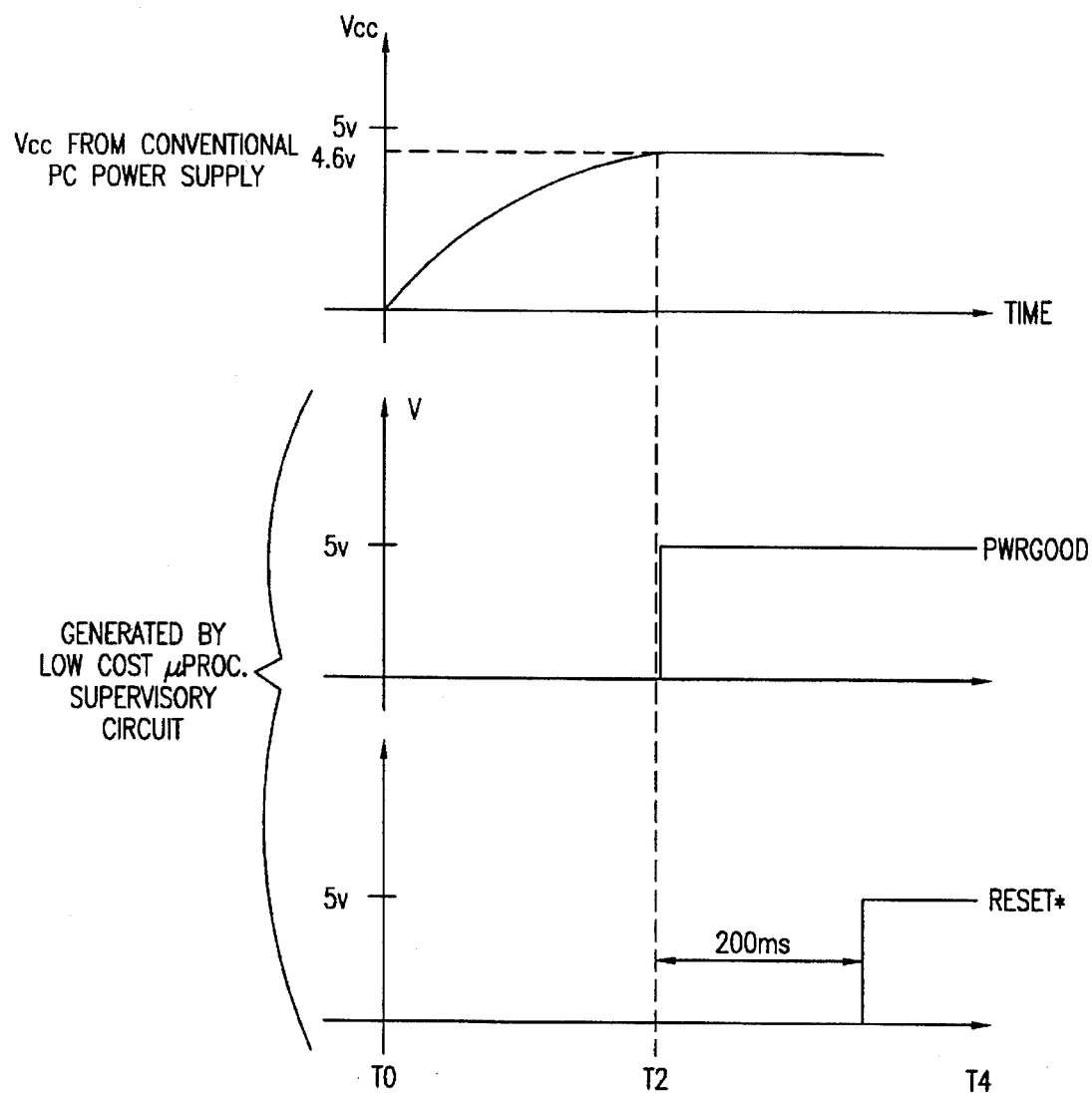
FIG. 6 is a timing diagram illustrating operation of the embodiment of FIG. 5.

Operation of the dual power supply circuit 500 is now described with reference to FIG. 6, which is a timing diagram illustrating operation of the dual power supply circuit 500. Upon power-up at time T0, the +5 V signal begins to rise until eventually regulated at approximately 5 V. The RESET* signal is asserted during power-up. The PWRGOOD signal is initially de-asserted low, so that the FET 20 is activated, so that the power supplies 504, 506 attempt to provide separate power signals to the device 502. If the device 502 is a split-plane device, the core section 502b rises to 2.5 V and the I/O section 502a rises to 3.3 V. However, if the device 502 is a uni-plane device, both the I/O and core sections 502a, 502b are pulled to the higher voltage level of 3.3 V.

As the +5 V signal is rising, the power supply 504 and power supply 506 begin regulating at their respective voltages. The comparator 512 initially asserts its output high and keeps its output high if the core section 502b remains below 2.8 V, indicating a split-plane device. However, the comparator 512 asserts its output low if the device 502 is a uni-plane device, where the core section 502b is pulled to the higher voltage level of 3.3 V. When the +5 V signal rises to approximately 4.6 V at time T2, the supervisory circuit 516 asserts the PWRGOOD signal which clocks the latch 514. If the device 502 is a split-plane device, the inverted Q output is pulled low, thereby keeping the output of the NAND gate 518 high and FET 520 remains on, so that the power supply 506 continues to provide separate voltage to the I/O section 502a. However, if the device 502 is a uni-plane device, the output of the comparator 512 is asserted low and the inverted Q output is asserted high while the PWRGOOD signal is asserted high, so that NAND gate 518 asserts its output low turning off the FET 520. In this manner, the power supply 506 is disconnected from providing power to the device 502. In this case, the power supply 504 provides sole operating voltage to the device 502. 200 ms later at time T4, the RESET* signal is de-asserted. In this manner, the mode decision is made almost immediately after the PWRGOOD signal is asserted at time T2, long before the electronic device is pulled out of reset upon power-up.

The power supply 504 is preferably a programmable supply in the preferred embodiment and can provide any one of a number of several different operating voltages as desired. In the preferred embodiment, the Q output of the latch 514 provides a signal to the power supply 504, causing the power supply 504 to assert a different voltage level if the device 502 is a uni-plane device. For example, if the device 502 is a uni-plane device, and the voltage of the core section 502b is forced to the higher voltage level, the power supply 504 attempts to pull its output low to regulate at the lower voltage level. However, the power supply 504 also detects the Q output being asserted low and reprograms its output to 3.3 V for providing the higher voltage level to the device 502 if uni-plane mode is desired.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A detection and switch system for a power supply which provides power to a device, the power supply including two voltage supplies and corresponding outputs for providing one output voltage in a uni-plane mode if the device is a uni-plane device and for providing two separate output voltages in a split-plane mode if the device is a split-plane device, said detection and switch system comprising:
   a switch circuit for coupling to the two voltage supplies and receiving a select signal for selecting between uni-plane and split-plane modes; and
   a detection circuit for monitoring at least one of the outputs of the two voltage supplies and for providing said select signal to said switching circuit for selecting the appropriate mode based on the voltage level of at least one of the output voltages.

2. The detection and switch system of claim 1, wherein said switch circuit initially selects the split-plane mode upon power-up.

3. The detection and switch system of claim 1, wherein said detection circuit compares the output voltages of the two voltage supplies and asserts said select signal based on the voltage difference between the outputs.

4. The detection and switch system of claim 1, wherein the two voltage supplies include first and second voltage regulators including separate feedback circuits providing first and second corresponding feedback signals for regulating first and second output voltage levels, respectively, and wherein the second voltage regulator includes an error amplifier for comparing one of the first and second feedback signals with a reference voltage for regulating the second output voltage.

5. The detection and switch system of claim 4, wherein said switch circuit comprises:
   a first analog gate receiving the first feedback signal for providing the first feedback signal to the error amplifier of the second voltage regulator when activated; and
   a second analog gate receiving the second feedback signal for providing the second feedback signal to the error amplifier of the second voltage regulator when activated.

6. The detection and switch system of claim 5, wherein said detection circuit comprises:
   a latch circuit for providing a first enable signal to said first analog gate and a second enable signal to said second analog gate for enabling only one of said first and second analog gates at a time;
   a timing circuit coupled to said latch circuit for setting said latch circuit upon power-up to initially select said second analog gate, said timing circuit receiving a reset signal and establishing a predetermined time period from power-up, wherein if said reset signal is asserted within said predetermined time period, said timing circuit toggles said latch circuit to enable said first analog gate for selecting the uni-plane mode; and
   a comparator circuit for comparing the first and second output voltage levels and asserting said reset signal if the difference between the voltage levels of the first and second output voltages is less than a predetermined amount.

7. The detection and switch system of claim 6, wherein said detection circuit includes:
   said latch circuit comprising a latch having a set and a reset input; and
   said timing circuit comprising:
      a first timer for providing a set signal for a first predetermined time period after power-up to said set input of said latch for initially selecting the split-plane mode;
      a second timer for providing a reset enable signal for a second predetermined time period after power-up, said second predetermined time period being longer than said first predetermined time period, wherein said second timer negates said reset enable signal after said second predetermined time period has expired; and
      a gate receiving said set signal to negate said reset input of said latch during said first predetermined time period, said gate further receiving said reset enable signal and said reset signal for resetting said latch to switch to the uni-plane mode if said reset signal is asserted before said second predetermined time period has expired.

8. The detection and switch system of claim 7, wherein both said first and second time periods expire after the first and second output voltages reach a regulating level.

9. The detection and switch system of claim 6, wherein said detection circuit includes:
   said latch circuit comprising a latch having a set and a reset input; and
   said timing circuit comprising:
      a first timer for providing a set signal for a first predetermined time period after power-up to said set input of said latch for initially selecting the split-plane mode;
      a second timer receiving said set signal for providing a reset enable signal for a second predetermined time period initiated upon the expiration of said first predetermined time period when said set signal is negated; and
      a gate receiving said set signal to negate said reset input of said latch during said first predetermined time period, said gate further receiving said reset enable signal and said reset signal for resetting said latch to select the uni-plane mode if said reset signal is asserted during said second predetermined time period.

10. The detection and switch system of claim 9, wherein said first and second predetermined time periods both expire after the first and second output voltages reach a regulating level.

11. The detection and switch system of claim 5, further comprising:
- a disable circuit for disabling the second voltage regulator upon power-up to when the first output voltage is greater than a first reference voltage;
- a latch circuit for providing a first enable signal to said first analog gate and a second enable signal to said second analog gate for enabling only one of said first and second analog gates at a time;
- a first comparator for asserting a set signal to said latch circuit to select the split-plane mode upon power-up and until the first output voltage is greater than a second reference voltage, wherein said second reference voltage is less than said first reference voltage;
- a second comparator for asserting said reset signal if the first output voltage is greater than said second output voltage;
- a timing circuit receiving said set signal and for providing a reset enable signal for a predetermined time period initiated after said set signal is negated; and
- a gate receiving said reset enable signal and said reset signal for resetting said latch circuit to select the uni-plane mode if said reset signal is asserted during said predetermined time period.

12. The detection and switch system of claim 11, wherein said first and second reference voltages are both below final regulating levels of the first and second output voltages, so that the mode is selected prior to the first and second output voltages reaching regulating voltage levels.

13. The detection and switch system of claim 1, wherein the two voltage supplies include a first power supply providing a first output voltage and a second power supply providing a second output voltage.

14. The detection and switch system of claim 13, wherein said switch circuit couples the second power supply to provide the second output voltage to the device in split-plane mode and disconnects the second power supply in uni-plane mode.

15. The detection and switch system of claim 14, wherein said switch circuit includes a field effect transistor for coupling or disconnecting the second power supply.

16. The detection and switch system of claim 13, wherein said detection circuit comprises:
- means for generating a reference signal; and
- a comparator for comparing a supply voltage developed by the device in response to receiving the first output voltage with said reference signal.

17. The detection and switch system of claim 16, wherein said comparator asserts said select signal to indicate split-plane mode while said supply voltage is less than said reference signal.

18. The detection and switch system of claim 17, wherein said switch circuit comprises:
- a latch receiving said select signal;
- a supervisory circuit for asserting a power good signal when a primary voltage source achieves a regulating voltage level, said power good signal clocking said latch when asserted;
- a gate coupled to said latch and receiving said power good signal, said gate having an output indicating split-plane mode and switching based on the state of said latch when clocked; and
- a switch coupled to said gate for connecting and disconnecting the second power supply to the device.

19. The detection and switch system of claim 18, wherein the first power supply is programmable and coupled to said latch, wherein the first power supply asserts the first output voltage at one voltage level in split-plane mode and at a second voltage level in uni-plane mode.

20. A dual output power supply for providing source voltage to either a uni-plane or a split-plane device, comprising:
- a first voltage regulator including a first feedback circuit for regulating a first output voltage;
- a second voltage regulator including a second feedback circuit for regulating a second output voltage according to a split-plane mode; and
- a switch circuit for disconnecting said second feedback circuit from, while coupling said first feedback circuit to, said second voltage regulator according to a uniplane mode wherein said first and second output voltages are regulated at the same voltage level.

21. The power supply of claim 20, wherein said switch circuit comprises:
- a first switch for coupling said first feedback circuit to said second voltage regulator according to said uni-plane mode; and
- a second switch for coupling said second feedback circuit to said second voltage regulator according to said split-plane mode.

22. The power supply of claim 21, further comprising:
- said first switch including an analog gate receiving a first enable signal;
- said second switch including an analog gate receiving a second enable signal;
- a latch circuit for providing said first and second enable signals for activating only one of said first and second analog gates at a time; and
- a detection circuit coupled to said latch circuit for initializing said latch circuit according to said split-plane mode upon power-up and for switching said latch circuit according to said uni-plane mode if said first and second output voltages differ by less than a predetermined amount after power-up.

23. The power supply of claim 20, further comprising:
- a detection circuit coupled to said switch circuit for initializing said switch circuit according to said split-plane mode upon power-up and for toggling said switch circuit according to said uni-plane mode if said first and second output voltages are at different voltage levels after power-up.

24. The power supply of claim 23, wherein said detection circuit comprises:
- a disable circuit for disabling said second voltage regulator from regulating said second output voltage until said first output voltage reaches a predetermined voltage level;
- said switch circuit initialized according to said split-plane mode upon power-up; and
- a comparator for toggling said switch circuit according to said uni-plane mode if the difference between said first and second output voltages is greater than a predetermined amount before said first output voltage reaches said predetermined voltage level.

25. The power supply of claim 24, wherein said predetermined voltage level is substantially less than regulated voltage level of both said first and second output voltages.

26. The power supply of claim 24, further comprising:

said disable circuit including a second comparator for comparing said first output voltage with said predetermined voltage level; and a third comparator for asserting a set signal to initialize said switch circuit upon power-up until said first output voltage reaches a second predetermined voltage level being less than said predetermined voltage level, wherein said set signal is then negated.

27. The power supply of claim 26, further comprising:

said switch circuit including a latch circuit receiving said set signal for initializing said switch circuit according to said split-plane mode upon power-up, said latch circuit receiving a reset signal for toggling said switch circuit according to said uni-plane mode; and said comparator asserting a toggle signal if the difference between said first and second output voltages is greater than said predetermined amount; and a timing circuit for monitoring said toggle signal for a predetermined time period after said set signal is negated, wherein said timing circuit asserts said reset signal if said toggle signal is asserted during said predetermined time period.

28. A system for providing source voltage to a device which is either a uni-plane device or a split-plane device, comprising:

a first power supply providing a first output voltage to the device;

a second power supply providing a second output voltage to the device;

a switch circuit for coupling said second power supply to the device if split-plane and for disconnecting said second power supply if uni-plane; and a comparator circuit coupled to said first power supply and said switch circuit for controlling said switch circuit based on the voltage level of the device.

29. The system of claim 28, the device including a first portion receiving said first output voltage and a second portion receiving said second output voltage, further comprising:

means for providing a reference signal; and said comparator circuit comparing the voltage of the first portion of the device with said reference signal for asserting a signal indicative of the type of device.

30. The system of claim 29, wherein said switch circuit comprises:

a latch circuit receiving said signal indicative of the type of device;

a supervisory circuit for asserting a power good signal to said latch circuit, said power good signal initially being de-asserted to control said switch circuit to select split-plane and then clocking said latch circuit when asserted; and a transistor circuit coupled to said latch circuit.

* * * * *

UNITED STATES PATENT AND TRADEMARK OFFICE
CERTIFICATE OF CORRECTION

PATENT NO. : 5,637,991  
DATED : June 10, 1997  
INVENTOR(S) : Brown et al.

Page 1 of 2

It is certified that error appears in the above-identified patent and that said Letters Patent is hereby corrected as shown below:

In the Drawings, insert Fig. 4.

Signed and Sealed this

Seventh Day of April, 1998

Attest:

BRUCE LEHMAN

*Attesting Officer*  *Commissioner of Patents and Trademarks*